Jan. 4, 1949.  A. A. BUREAU  2,458,340
METHOD OF ELECTRICALLY WELDING
COMPOSITE METAL REEL HEADS
Filed May 20, 1944  2 Sheets-Sheet 1
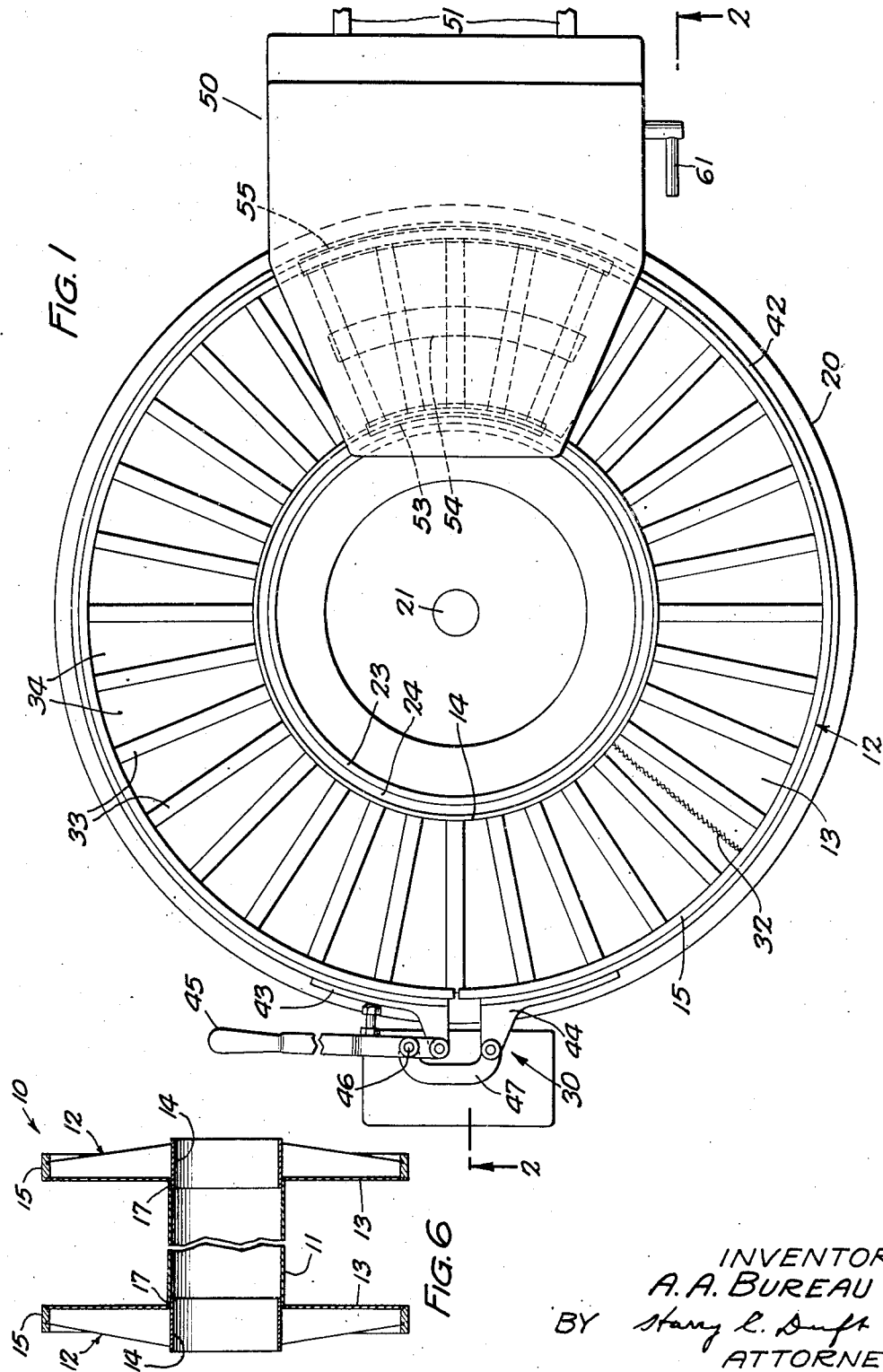
INVENTOR
A. A. BUREAU
BY
ATTORNEY

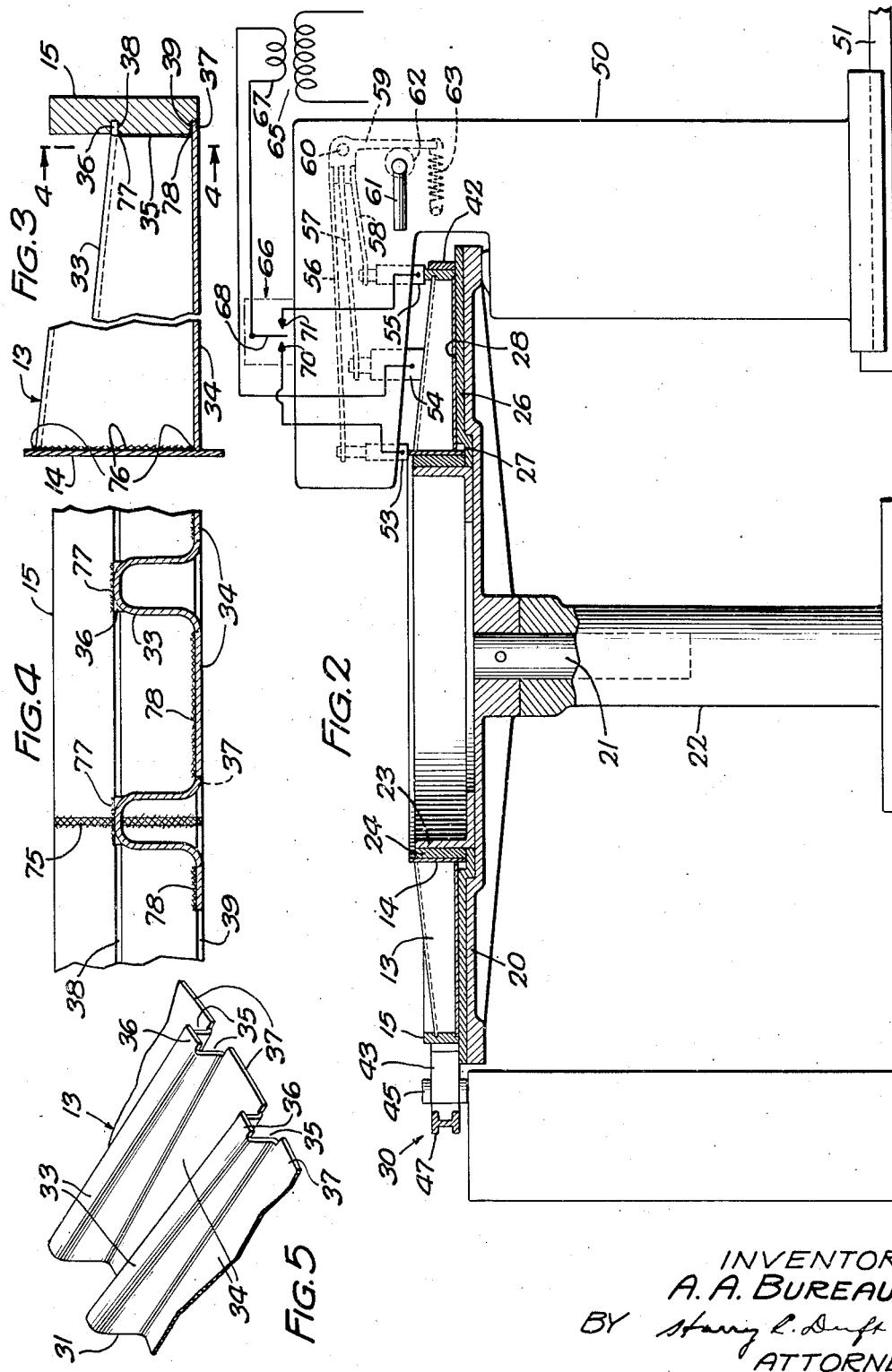

Patented Jan. 4, 1949

2,458,340

UNITED STATES PATENT OFFICE 2,458,340

METHOD OF ELECTRICALLY WELDING COMPOSITE METAL REEL HEADS

Arthur A. Bureau, Chicago, Ill., assignor to Western Electric Company, Incorporated, New York, N. Y., a corporation of New York Application May 20, 1944, Serial No. 536,520

3 Claims. (Cl. 219—10)

This invention relates to a method of making reel heads and more particularly to a method of electrically welding together a plurality of metal parts to form a reel head.

Objects of this invention are to provide an efficient and effective method of forming a reel head.

In one embodiment of this invention, there is provided a reel head comprising an annular radially corrugated head sheet provided with a plurality of peripheral tongues fitting into annular grooves in an outer rim encircling the head sheet and united therewith and an inner rim engaging the inner edge of the annular head sheet and united therewith. In fabricating the reel head, an inner rim, a corrugated annular head sheet and a split outer rim are assembled on a rotatable table and are pressed together by a clamping device, after which a welding fixture is moved into position over a portion of the assembled reel head. Arcuate electrodes are applied to a section of each of the rims and the head sheet and a current is passed therethrough to alternately weld a section of each of the rims to the head sheet, after which the operation is repeated to weld successive portions of the rims to the head sheet.

The invention will be more fully understood from the following description, taken in connection with the accompanying drawings, illustrating a preferred embodiment in which Fig. 1 is a plan view of an apparatus employed in practicing this invention showing the reel head in position thereon and a welding fixture in position to weld;

Fig. 2 is a vertical irregular section taken on the line 2—2 of Fig. 1;

Fig. 3 is an enlarged section of a portion of the completed reel head with parts broken away;

Fig. 4 is a fragmentary section of the reel head taken on the line 4—4 of Fig. 3;

Fig. 5 is a view in perspective of a portion of the corrugated head sheet; and

Fig. 6 is a schematic axial section of a completed reel.

Referring to the drawings, particularly Fig. 6, there is shown a reel 10 on which may be wound telephone cable and the like comprising a drum 11, to which is attached at each end a reel head 12. The reel head 12 comprises a radially corrugated annular head sheet 13, to the inner and outer peripheries of which are secured inner and outer rims 14 and 15, respectively. The reel head 12 may be attached to the drum 11 by welding the drum to the projecting ends of the inner rim 14, as indicated at 17.

In the fabrication of the reel head, an apparatus is used which is illustrated in Figs. 1 and 2 and which comprises a circular table 20 having secured thereto a vertical shaft 21, the table 20 and the shaft 21 being rotatably mounted in a standard 22. Fixed to the upper surface of the table and concentric with the axis thereof is a locating ring 23 for positioning the inner rim 14 of the reel head and which is lined with an asbestos ring 24. The outer upper portion of the table for supporting the parts of the reel head is covered by a layer of asbestos 26, the table and the asbestos layer being offset to provide a surface 27 for supporting the inner rim 14 and a surface 28 for supporting the head sheet 13, the outer rim 15 and a clamping device 30, later to be described.

The inner rim 14 forming a closed band made from a flat metal strip is positioned around the locating ring 23 and rests upon the surface 27 of the table. The head sheet 13 is next placed upon the surface 28 of the table 20 and positioned so that the inner edge 31 thereof engages the periphery of the inner rim 14. The head sheet 13 is made from a pre-cut substantially rectangular metal sheet which is then corrugated to form an annulus with its ends welded together, as indicated at 32. The crests of the corrugations are of varying depth and form spoke-like ribs 33 radiating from the axis of the head sheet and the trough portions 34 intermediate the ribs 33 are flat and lie in a plane. The outer ends of the walls of the ribs 33 are notched, as at 35, to form a plurality of arcuate tongues 36 and 37 extending from the ribs 33 and the portions 34 of the head sheet. The tongues 36 are flattened and lie in a plane parallel to the tongues 37, the tongues 36 and 37 being equidistant from the center of the head sheet. The outer rim 15 is made from a metal strip having longitudinal recesses 38 and 39 formed therein. The strip is cut to the proper length and bent into circular shape and fitted around the head sheet so that the projecting tongues 34 and 36 on the head sheet fit into the recesses in the outer rim. The annular recesses 38 and 39 of the rim 15 form a plurality of shoulders that engage the side faces of the tongues 34 and 36 and the bottoms of the recesses 38 and 39 form cylindrical portions that engage the peripheral edge portions of the tongues.

A clamping device 30 for clamping the outer and inner rims to the head sheet is provided and comprises a flexible band 42 adapted to fit around the outer rim 15. The ends of the band 42 are attached to pivot brackets 43 and 44. An operating lever 45 is pivoted at one end to the bracket 43 and is also pivotally attached at 46 to a link 47, the opposite end of which is attached to the bracket 44. With the band 42 surrounding the assembled parts of the reel head, the lever 45 may be moved to the position shown in Fig. 1 to clamp the outer rim 15 against the head sheet 13 and the slightly compressible head sheet against the inner rim 14 so as to press the inner edge 31 of the corrugated head sheet tightly against the inner rim 14 and the outer edge of the peripheral tongues 34 and 36 tightly against the bottoms of the grooves 38 and 39 of the outer rim 15. The band 42 may be made from leather or woven fabric and is of less width than the outer rim 15.

After the inner rim 14, reel head 13 and the outer rim 15 have been assembled and clamped tightly together, they are then ready to be united by means of a welding operation. For this purpose, a welding fixture 50 is provided and is mounted on a pair of rails 51 so that it may be moved to and from the welding position shown in Figs. 1 and 2, where the upper part overhangs the portion of the reel head. Arcuate electrodes 53, 54 and 55, suitably insulated and mounted for vertical movement, are carried by flexible arms 56, 57 and 58, which are secured to a lever 59 pivoted at 60. A handle 61, having a cam 62 engaging the lever 59, is used to move the electrodes downwardly against the pull of the spring 63, which acts to return the electrodes to the normal raised position. The electrodes are connected to a suitable source of current through a transformer 65 and a control switch 66, as shown in diagrammatic form in Fig. 2. The electrode 54 is connected to one end of the secondary 67 of the transformer 65, the other end of which is connected to a switch arm 68 of the control switch 66. The electrodes 53 and 55 are connected to contacts 70 and 71 of the control switch 66.

With the reel head in assembled position on the table, the electrodes 53, 54 and 55 are moved downwardly into engagement with the inner rim 14, the head sheet 13 and the outer rim 15, respectively, by the actuation of the handle 61. The control switch 66 is then operated to move the switch arm 68 alternately and for a predetermined period of time into engagement with the contacts 70 and 71 to permit the passage of a current of welding strength alternately through the head sheet 13 and each of the rims 14 and 15 to weld a section of the rims 14 and 15 to the head sheet 13. Upon completion of the welding operation, the handle 61 is turned to permit the electrodes to be raised, after which the table 20 is rotated to present the adjacent unwelded section of the reel head to the welding fixture 50. The welding operation is repeated to weld successive portions of the rims 14 and 15 to the head sheet 13 throughout its circumference.

To permit the table and the reel head assembly to rotate through 360° to weld the entire head, the clamping device 30 may be released when the lever 45 gets close to the welding fixture and reclamped on the reel head in another position. After the rims have been welded to the head sheet throughout its circumference, the welding fixture 50 is moved back to clear the table 20, the clamping device 30 is removed, and the ends of the split outer rim 15 are welded together in a suitable manner, as shown at 75 in Fig. 4.

The inner rim 14 and the head sheet 13 are made from relatively thin metal so that the contacting portions of each, when pressed together and subjected to a current of welding strength, will heat up and fuse together, thus forming a continuous welded joint or homogeneous bond 76 between the head sheet and the inner rim 14. In order to secure sufficient heat to insure fusion of the contacting portions of the heat sheet and the relatively thicker outer rim when the electric current is passed therethrough, the parts are shaped, as heretofore described, so as to increase the area of the contacting surfaces therebetween. Thus the projecting tongues 36 and 37 on the head sheet fit into recesses 38 and 39 in the rim and contact along their peripheral edges and at least one of their sides with portions of the rim 15 to form the extended area of contact. Then, as the current passes through the head sheet and the rim, the contacting portions thereof will be heated and fused together to form a series of staggered welded joints or homogeneous bonds, as indicated at 77 and 78.

By the practice of this method of assembling and welding, a reel head may be formed involving a minimum expenditure of time and labor. Also, it will be seen that a rugged reel head is formed having a corrugated head sheet bonded to an outer rim by two rows of spaced welded joints around its circumference and bonded to the inner rim by a continuous welded joint extending sinuously, axially and circumferentially therebetween.

What is claimed is:

1. A method of forming a reel head comprising assembling inner and outer annular metal members in abutting relation to an intermediate annular metal member, engaging in radial alignment an arcuate portion of substantial length of each of the annular members with individual conforming electrodes, completing circuits to the electrodes to pass a welding current through the intermediate member and alternately the inner and outer members to weld alternately arcuate sections of substantial length of the inner and outer annular members to the intermediate annular member, and thereafter engaging successive portions of the annular members with the conforming electrodes and completing circuits to the electrodes to pass a welding current through the intermediate member and alternately the inner and outer members to weld alternately successive portions of the inner and outer members to the intermediate member.

2. A method of forming a reel head comprising assembling inner and outer annular metal members in abutting relation to an intermediate annular metal member, engaging a relatively large arcuate portion of each of the annular members with a conforming electrode in radial alignment with each other, completing a circuit to the electrodes to pass a welding current through the intermediate annular member and alternately the inner and outer annular members to weld alternately a relatively large arcuate section of the inner and outer annular members to the intermediate annular member, rotating the annular members as a unit through a predetermined arc intermittently through one revolution, and in sequence engaging successive portions of the annular members with the conforming electrodes and completing a circuit to the electrodes to weld alternately successive portions of the inner and outer annular members to the intermediate annular member.

3. A method of making a reel head comprising, forming a metal sheet into an annular head sheet having radial corrugations therein, notching the axially extending outer end portions of said corrugations on said head sheet to provide radially projecting tongue portions parallel to the plane of the head sheet, bending a metal strip having longitudinal grooves therein into an annular rim, assembling the rim around the head sheet so that the projecting tongue portions on the head sheet engage in the grooves of the rim, clamping the rim against the edge of the sheet, passing a welding current through radially aligned relatively large arcuate portions of the head sheet and the rim to simultaneously weld to the rim a plurality of adjacent tongue portions of the corrugated head sheet, and passing welding current through successive relatively large arcuate portions of the head sheet and the rim to form a weld between the rim and the tongue portions of the head sheet.

ARTHUR A. BUREAU.

REFERENCES CITED

The following references are of record in the file of this patent:

UNITED STATES PATENTS

| Number | Name | Date |
| --- | --- | --- |
| 828,033 | Lachman | Aug. 7, 1906 |
| 1,749,917 | Meadowcroft | Mar. 11, 1930 |
| 1,876,140 | Gallup | Sept. 6, 1932 |
| 2,006,458 | Jones et al. | July 2, 1935 |
| 2,108,795 | Budd | Feb. 22, 1938 |
| 2,183,219 | Hollesen | Dec. 12, 1939 |
| 2,229,722 | Bureau | Jan. 28, 1941 |
| 2,245,298 | Proctor | June 10, 1941 |